(12) United States Patent
Gschwind et al.

(10) Patent No.: US 6,839,828 B2
(45) Date of Patent: Jan. 4, 2005

(54) SIMD DATAPATH COUPLED TO SCALAR/VECTOR/ADDRESS/CONDITIONAL DATA REGISTER FILE WITH SELECTIVE SUBPATH SCALAR PROCESSING MODE

(75) Inventors: Michael Karl Gschwind, Mohegan Lake, NY (US); Harm Peter Hofstee, Austin, TX (US); Martin Edward Hopkins, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 09/929,805

(22) Filed: Aug. 14, 2001

(65) Prior Publication Data

US 2003/0037221 A1 Feb. 20, 2003

(51) Int. Cl.[7] .............................................. G06F 15/80
(52) U.S. Cl. .............................. 712/20; 712/3; 712/22; 713/324
(58) Field of Search .............................. 712/3, 20, 22, 712/32; 713/324

(56) References Cited

U.S. PATENT DOCUMENTS

| | | | | |
|---|---|---|---|---|
| 4,748,585 A | * | 5/1988 | Chiarulli et al. | 712/15 |
| 5,423,051 A | | 6/1995 | Fuller et al. | 709/395 |
| 5,758,176 A | | 5/1998 | Agarwal et al. | 395/800 |
| 5,778,241 A | * | 7/1998 | Bindloss et al. | 712/20 |
| 6,192,467 B1 | * | 2/2001 | Abdallah et al. | 712/222 |
| 6,195,746 B1 | | 2/2001 | Nair | 712/217 |

OTHER PUBLICATIONS

M. Tremblay et al. "VIS Speeds New Media Processing", IEEE Micro,Aug. 1996 pp. 10–22.

R. Lee, "Multimedia Enhancements for PA–RISC Processors" Hewlett–Packard Company, HotChips VI, 8/94 pp. 7.3.1–7.3.10 (183–191).

K. Diefendoroff et al. "How Multimedia Workloads Will change Processor Design", Computer, Sep. 1997 pp. 43–45.

T. M Conte et al. "Challenges to Combining General–Purpose and Multimedia Processors" Dec. 1997, Computer IEEE pp. 33–37.

R. B. Lee "Subword Parallelism with MAX–2" Hewlett Packard IEEE Micro, Aug. 1996 pp. 51–59.

A. Peleg et al. "MMX Technology Extension to the Intel Architecture" IEEE Micro Aug. 1996 pp. 42–50.

A. Peleg et al., "Intel MMX for Multimedia PCs" Communications of the ACMM Jaury 1997/vol. 40, No. 1 pp. 25–38.

* cited by examiner

Primary Examiner—Kenneth S. Kim
(74) Attorney, Agent, or Firm—Keusey, Tutunjian & Bitetto, P.C.; Louis J. Percello (57) ABSTRACT

There is provided a processor designed to operate in a plurality of modes for processing vector and scalar instructions. Register files are each for storing scalar and vector data and address information. A parallel vector unit, coupled to the register files, includes functional units configurable to operate in a vector operation mode and a scalar operation mode. The vector unit includes an apparatus for tightly coupling the functional units to perform an operation specified by a current instruction. Under a vector operation mode, the vector unit performs, in parallel, a single vector operation on a plurality of data elements. The operations performed on the plurality of data elements are each performed by a different functional unit of the vector unit. Under a scalar operation mode, the vector unit performs a scalar operation on a data element received from the register files in a functional unit within the vector unit.

21 Claims, 8 Drawing Sheets

SIMD DATAPATH COUPLED TO SCALAR/VECTOR/ADDRESS/CONDITIONAL DATA REGISTER FILE WITH SELECTIVE SUBPATH SCALAR PROCESSING MODE

BACKGROUND OF THE INVENTION

1. Field of the Invention

The present invention generally relates to the implementation of microprocessors, and more particularly to an improved processor implementation having a unified scalar and SIMD datapath.

2. Background Description

Contemporary high-performance processors support multimedia-processing, using single instruction multiple data (SIMD) techniques for exploiting instruction-level parallelism in programs; that is, for executing more than one operation at a time. In general, these processors contain multiple functional units, some of which are directed to the execution of scalar data and some of which are grouped for the processing of structured SIMD vector data. SIMD data streams are often used to represent multimedia datatypes, such as color information, using, for example, the RGB format by encoding the red, green, and blue components in the structured data type, or coordinate information, by encoding position as the quadruple (x, y, z, w). Diefendorff et al, "How Multimedia Workloads Will Change Processor Design", Computer, Vol. 30, No. 9, IEEE, September 1997, and Conte et al, "Challenges to Combining General-Purpose and Mulitmedia Processors", Computer, Vol. 30, No. 12, IEEE, December 1997, give an overview of multimedia processing using SIMD processing techniques. Implementations based on the addition of a full-function SIMD processing block to an existing scalar block lead to large processor cores where multiple units are unnecessarily replicated, each replica dedicated to the processing of either scalar data or one element of the structured multimedia data type.

To date, processors designed for processing multimedia data have typically been implemented by augmenting an existing scalar processor implementation, for instance by adding a SIMD unit, the SIMD unit itself consisting of multiple functional units (i.e., fixed point units and floating point units) mirroring resources available for the processing of scalar data types, and replicating each functional unit type for the number of structured elements to be supported by the SIMD architecture. Often, the only units shared between the scalar and SIMD processing units are the issue logic, which issues instructions to either the scalar or SIMD processing blocks, and the load/store unit, which governs access to the memory subsystem.

Figure 1:
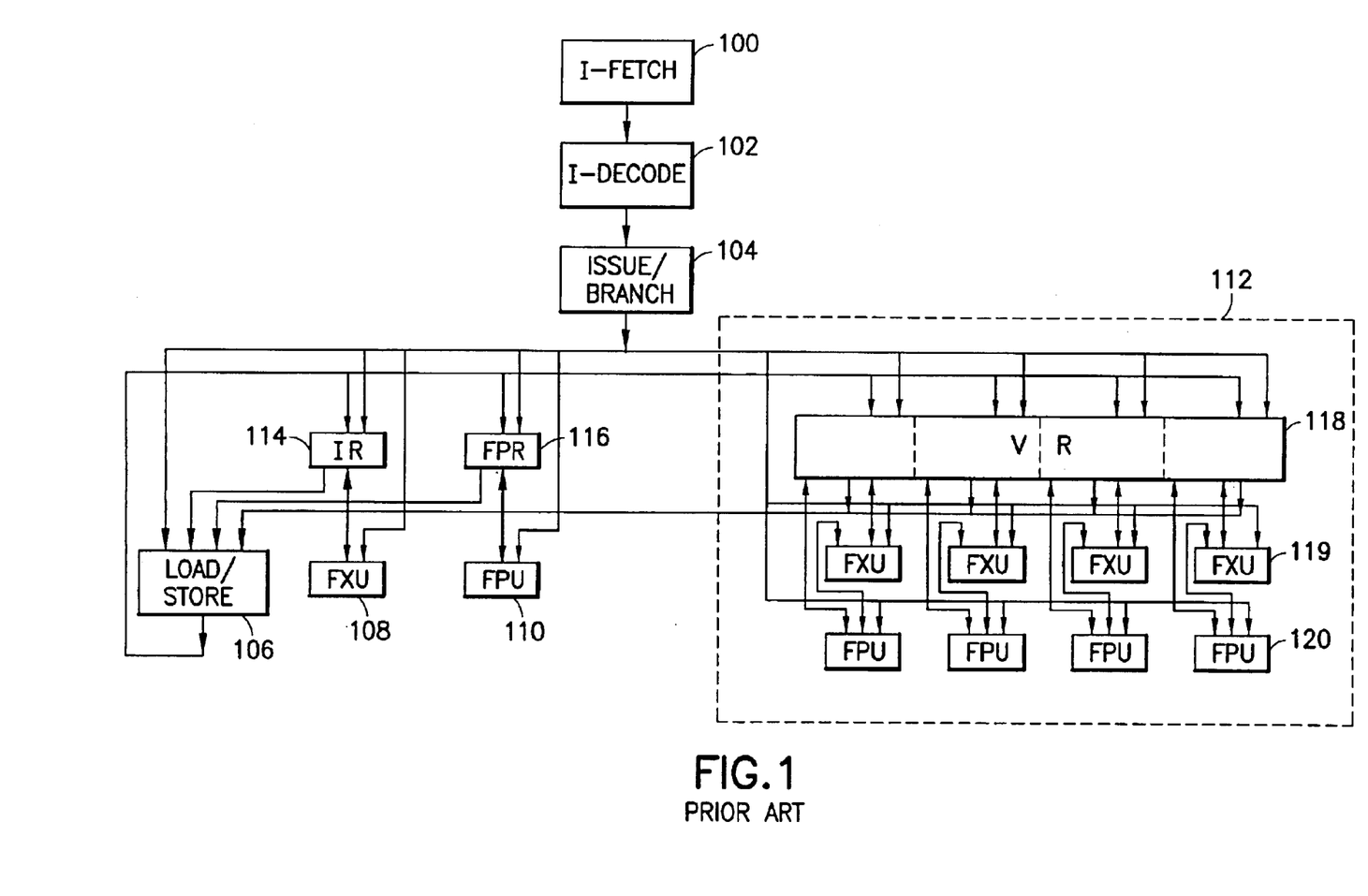
FIG. 1 is a block diagram describing a prior art processor containing both scalar processing units and a SIMD unit for processing structured data types, the SIMD unit consisting of multiple processing units for each element in the structured data type.

FIG. 1 is a block diagram depicting an example of a prior art processor containing both scalar processing units and a SIMD unit for processing structured data types, the SIMD unit comprising multiple processing units for each element in the structured data type. This processor implementation is exemplary of prior art systems; in some implementations, some register files may be shared, e.g., a combined integer and floating point register file, or additional register files may be present, such as a condition register file or a predicate register file for comparison results. But in general, the use of separate scalar and SIMD processors is inefficient and expensive in that such a configuration includes a number of redundant functional units and data paths. Furthermore, such implementations result in an undesirable amount of power consumption since while either the scalar or SIMD unit is processing data, the other is generally sitting idly by, awaiting its next instruction, but all the while consuming system power.

During operation of the system of FIG. 1, instructions are fetched by instruction fetch unit 100, and supplied to an instruction decode unit 102. Decoded instructions are passed to an issue/branch unit 104, where branch instructions are resolved and other instructions can be stored in the instruction issue unit thereof (not shown) until they can be executed in one of the functional units of the processor. The instruction issue unit can contain prediction logic, instruction reordering logic, instruction issue buffers and other logic supporting the high-performance issuing of instructions.

Instructions are issued by the issue/branch unit 104 to one or more of the load/store unit 106, the fixed-point unit 108, the floating-point unit 110, or the SIMD processing block 112. Before instructions can be processed by one or more of the processing units, one or more register accesses are usually required in a register file, e.g., the integer register file 114, the floating point register file 116, or the vector register file 118 which is a part of the SIMD multimedia extension found in many contemporary processors.

The SIMD multimedia processing block 112 typically contains a vector register file 118 for storing structured data (usually a vector consisting of four elements). The vector register file may be segmented into four sub-register files, each storing a single field of the structured data. The SIMD multimedia processor block 112 may contain several types of function units, each type being replicated for the number of elements in the structured data type supported by the multimedia extension. In FIG. 1, there are shown fixed point units 119 and floating point units 120 replicated four times to process one structure element each as can be found in the PowerPC™ VMX multimedia extension.

An alternative implementation style for combining scalar and SIMD processing capabilities, but which is applicable to very limited SIMD processing, is the use of subword parallelism. With subword parallelism, a single scalar unit can be partitioned into multiple subword units by inserting segmentation logic into the fixed point unit, e.g., by breaking a carry chain for addition and subtraction. However, such systems have been applied only to very limited applications, such as those that can be trivially bit-sliced, e.g., logic operations like OR and XOR, etc., and simple integer arithmetic, e.g., ADD, SUBTRACT, etc., but not to complex integer arithmetic like DIVIDE, MULTIPLY, those that require shift operations, or floating point arithmetic. An implementation of subword parallelism is described by R. Lee, "Multimedia Enhancements for PA-RISC Processors", Hot Chips VI, Palo Alto, Calif., August 1994. This approach may also be used in conjunction with the previously described SIMD implementation technique, e.g., to provide the capability to segment four 32-bit integer data fields into sixteen 8-bit data fields, for instance when it may be desirable to work on sixteen 8-bit data words in parallel instead of on four 32-bit data words, for instance when doing simple graphics rendering operations or for string searches.

Figure 2:
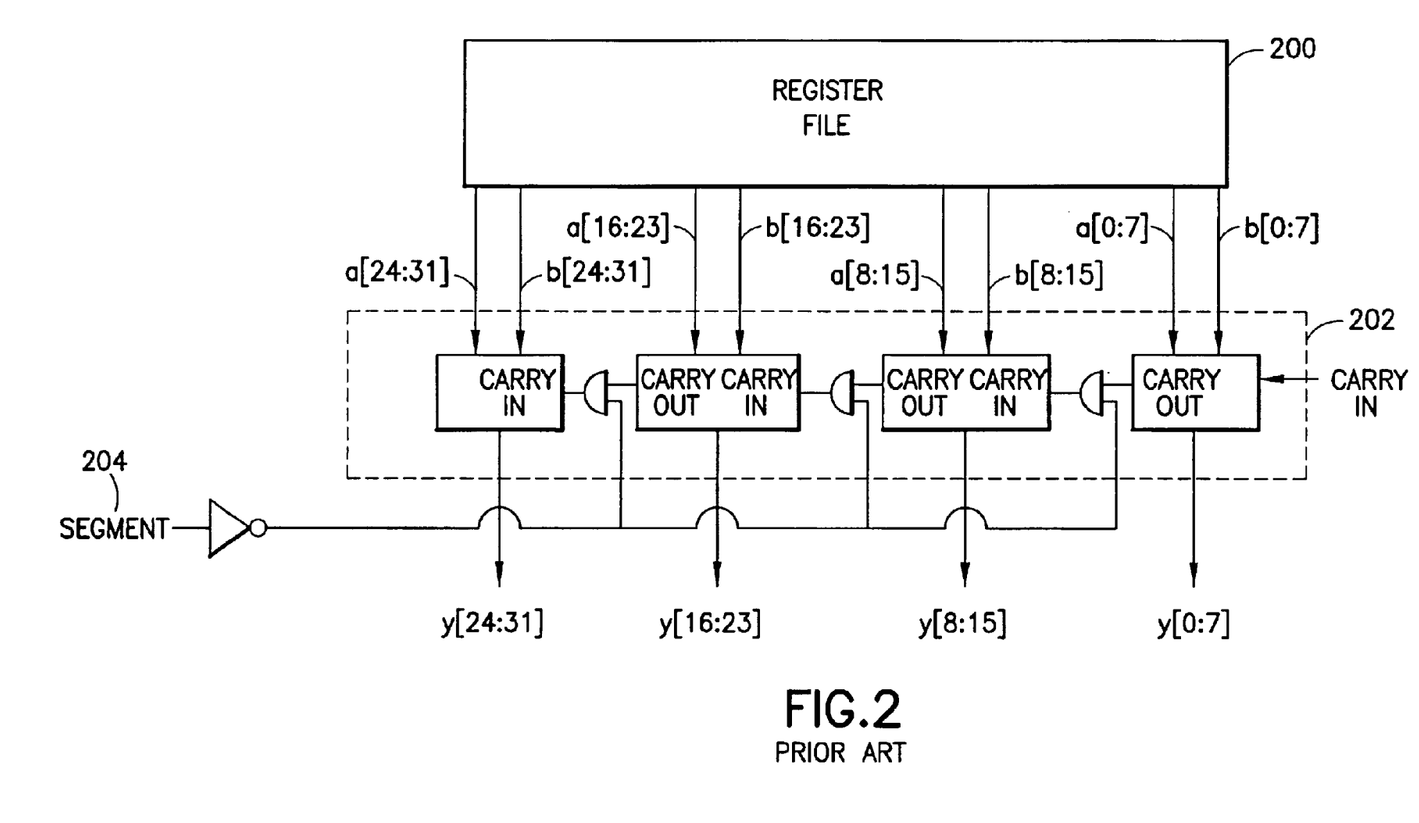
FIG. 2 is a block diagram describing SIMD subword parallelism achieved by segmenting a scalar processing unit according to the prior art.

FIG. 2 shows an example of SIMD subword parallelism achieved by segmenting a scalar processing unit. The figure depicts a 32-bit datapath comprising a register file 200 and an ALU 202 comprising four 8-bit ALU slices. Depending on the mode of operation indicated by the signal labeled 'segment' 204, the 32-bit ALU 202 can be segmented into four 8-bit data paths by disabling information from flowing across 8-bit boundaries. This can be achieved in an exemplary manner using the carry signal for a 32-bit addition/ subtraction operation, but a similar concept may be applied to other operations, e.g., by segmenting a multiplier array into sub-arrays dedicated to the processing of subword data types. Implementations based on subword parallelism, however, usually do not provide full functionality for the processing of all data types, but rather only for a subset of integer operations, in particular, only those integer operations which can be achieved by partitioning an integer ALU. Such implementations also suffer power inefficiency problems. For instance, when a required vector operation requires the use of fewer than all slices of the ALU 202, remaining idle slices nevertheless continue to consume power throughout the operation.

Yet another attempt to integrate scalar and vector processing functionality is described in U.S. Pat. No. 5,423,051, issued Jun. 6, 1995, to Fuller et al. (the "'051 patent"). The '051 patent describes a processor system having an execution unit which can execute both scalar and vector operations, the system including enhanced load/store units directed towards the loading and storing of scalar or vector data, and a collection of pipelined functional units which can execute on either scalar or vector data.

The system of the '051 patent is directed towards traditional vector processing applications wherein long vectors are processed serially on a single or several pipelined functional units which can be shared among scalar and vector processing, rather than the execution of scalar and vector data on more recent "short vector" machines, as exemplified by the vector extensions found in PowerPC™ VMX, AMD 3DNow™, or Intel x86MMX™/SSE/SSE2. These recent instruction set extensions are directed in particular towards multimedia processing typically employing short vectors (typically two to eight elements) and using tightly coupled parallel (and usually pipelined) processing units for each vector element. In addition, the system described in the '051 patent suffers from the same power consumption drawbacks that plague the other systems discussed in this section.

Thus, it is clear that a system and method are needed to control the execution on a tightly coupled parallel vector processing unit with coupled and parallel execution units such that scalar instructions can be processed. Furthermore, in light of the ever increasing need to reduce overall power consumption and heat dissipation in the processor, it is desirable to provide a system and method that can process scalar and vector data in an efficiently-designed processor while reducing power consumption.

SUMMARY OF THE INVENTION

It is, therefore, an object of the invention to provide a microprocessor implementation which (1) reduces the overall processor core size such that vector (multimedia) processing and scalar data processing are integrated and share common execution resources, (2) achieves this by merging the capabilities of scalar and SIMD data processing, (3) does not compromise SIMD data processing performance and (4) does not unnecessarily increase power consumption and heat dissipation.

These and other objects are achieved with the present invention, which is a processor designed to operate in a plurality of modes for processing vector and scalar instructions, where a vector instruction identifies a single operation to be performed on a plurality of data elements, and a scalar instruction identifies a single operation to be performed on a single data element, the processor comprising: a register file for storing scalar and vector data; a parallel vector unit coupled to receive data from the register file and comprising a plurality of functional units configurable to operate in a vector operation mode, and a scalar operation mode the parallel vector unit including means for tightly coupling each functional unit to perform an operation specified by the current instruction; wherein under the vector operation mode the parallel vector unit performs, in parallel, a single vector operation on a plurality of data elements, the operations performed on the plurality of data elements each being performed by a different functional unit of the parallel vector unit; and wherein under the scalar operation mode the parallel vector unit performs a scalar operation on a data element received from the register file in a functional unit within the parallel vector unit.

DETAILED DESCRIPTION OF PREFERRED EMBODIMENTS OF THE INVENTION

Figure 3:
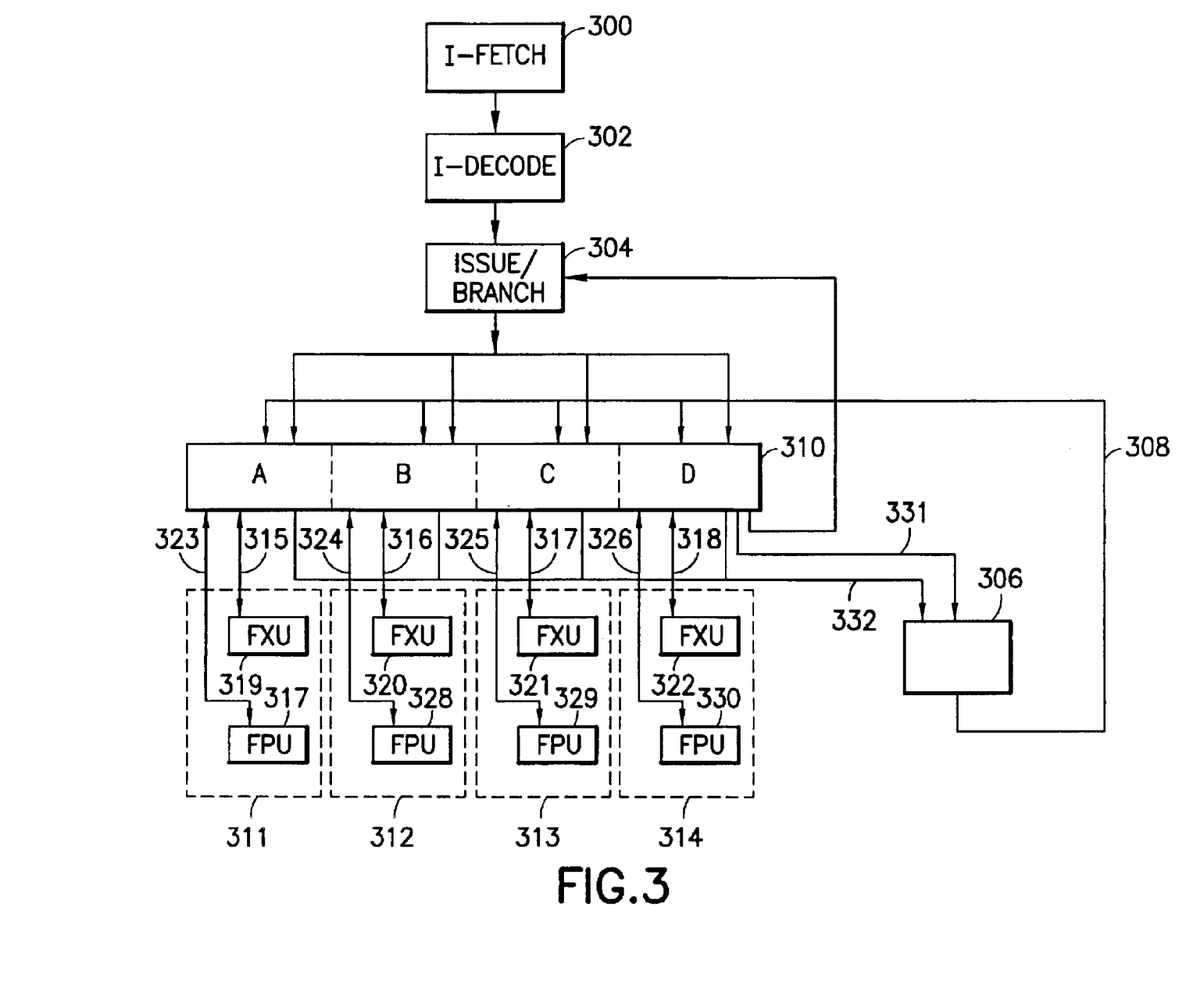
FIG. 3 is a block diagram of a processor implementation with unified scalar and SIMD data processing capability in accordance with the present invention.

A first embodiment of a processor implementation having a unified scalar and SIMD datapath in accordance with the invention will now be described with reference to FIG. 3. In FIG. 3, the scalar and SIMD data path processing capabilities have been combined, the SIMD vector datapath now subsuming scalar processing. Scalar processing preferably occurs in one of the units used for processing one element of a vector data type. This data unit is designated the "preferred slot" and provides addresses for the branch unit and the load/store unit, as will be described below.

In the following description, it should be understood that this is an exemplary implementation, and other implementations may use different execution resources and signaling structures. Also, while the description of function contained herein is based on load/store RISC architectures, it will be apparent to those skilled in the art that alternative instruction set architectures, e.g., CISC architectures with merged memory access/execute capability, may be implemented in accordance with the teachings of this invention.

The unified processor of FIG. 3 includes an instruction fetch unit 300, which fetches instructions and data from the system's memory hierarchy (not shown) based upon the value of the fetch unit's program counter. For simplicity, the depiction of the unified processor in FIG. 3 includes data flow connections only, and not control signal connections and external system interfaces, e.g., address lines, connections with memory, etc. The latter connections are assumed.

Fetched instructions are provided by instruction fetch unit 300 to instruction decode unit 302, where they are decoded and expanded into appropriate control signals for controlling downstream units. The expanded instruction is passed to issue/branch unit 304, where it is placed into an instruction queue to await availability of appropriate functional units for processing. In the event that the instruction is a branch, control is returned to instruction fetch unit 300, which fetches the branch-target instruction, and the above process is repeated.

In the case of a scalar operation, when a functional unit (i.e., fixed point unit or floating point unit) becomes available or in the case of a vector operation, when multiple functional units become available, the issue/branch unit 304 issues the instruction to the one or more functional units. Before computation can be performed, source operand data is retrieved by accessing a scalar-vector register file (SVRF) 310. An embodiment of the present invention will typically include multiple types of function units, e.g., fixed point units, floating point units, and a load/store unit (LSU) 306, the latter fetching from and storing to the memory hierarchy the data identified by the current instruction. The LSU 306 stores the result of memory accesses back to the combined SVRF 310 via bus 308. In this embodiment, SVRF 310 stores data lines consisting of four scalar data words, each line being partitioned such that each of the four data words is associated with a different functional unit pair (or set) 311–314, each functional unit pair consisting of a fixed point unit and a floating point unit as shown. The functional unit pairs make up what is referred to herein as a parallel vector unit.

Issue logic directs the SVRF 310 to pass the contents of a data line to the appropriate functional unit within each set of functional units, for processing. There may be any number and type of functional units associated with an issue slot, including, but not limited to, fixed-point unit, floating-point unit, comparison unit, logical operation unit, shift unit, etc. The particular functional unit within the set that will use the data word will depend on the instruction to be executed, and is controlled by a signal from issue/branch unit 304. Thus, if the instruction requires the fixed point units to operate on the data, data will be passed to fixed point units 319–322 via lines 315–318. If the instructions require floating point units 327–330, data will be passed via lines 323–326. If other functional unit types were present, data would similarly be passed to them. When each designated functional unit has performed its operation on the input data, it passes a result back to SVRF 310, where it is stored until requested by LSU 306, or passed to the functional units for further manipulation.

The operations to be performed by the functional units, and the functional units to perform those operations, are determined by control signals provided by issue/branch unit 304.

When an operation directs the LSU 306 to read data from SVRF 310, the data is passed via data bus 332. In addition, the address to which the data is to be stored in memory is passed to LSU 306 via bus 331. In the embodiment of FIG. 3, address bus 331 passes information from a segment (D) of SVRF 310, which is associated with functional unit pair 314 (this pair being designated a preferred slot, as described later). The preferred slot could be any of the functional units, by either defining them as preferred slot, or by means of dynamically determining a preferred slot, either by setting a control register, specifying a slot in the instruction word, or by determining it using any other means, e.g., by the issue unit at issue time. The designation of a preferred slot allows for selective powering-down of functional units, resulting in power savings, as discussed in more detail later.

To this point, the described operation of the unified processor has applied to both scalar and vector operations. That is, if an operation to be performed is a scalar operation, thus requiring operation and output of only one functional unit pair, the remaining functional unit pairs may nevertheless be directed to perform the same operation on data passed to them from the scalar vector register file. Such an approach allows for simplicity of design, since to require different functional units to simultaneously execute different operations necessarily introduces complicating design considerations. Likewise, for a vector operation, each functional unit pair will perform the same operation (or substantially the same operation as part of a tightly coupled operation, or a combination of tightly coupled operations as specified by a single instruction) on incoming data. In accordance with the invention, scalar and vector operations are distinguished by the manner in which associated address information is used, in accordance with the interpretation of the operation. The operation's interpretation may be a direct result of its operation code, that is, different operation codes may be available for different instructions (e.g., "load scalar byte," "load scalar word," "load scalar vector") or may depend on another part of the system, e.g., mode tag bits as described further below, to interpret a single "load" opcode. Even scalar data spans an address range of bytes (although fewer bytes than a vector), and there are also variations on how load/store may operate.

Unlike other functional units, which are typically assigned to a specific slot within the SVRF 310, the LSU 306 operates on the entire line of data, or a subset thereof, contained within SVRF 310. The LSU 306 operates in either load or store operation mode, depending on the instruction issued by the issue/branch unit 304. In load mode, LSU 306 receives address information from the preferred slot of the SVRF 310 using bus 331, and loads data from the specified address. When a load vector instruction is being executed, the load operation loads an entire line of data from memory to SVRF 310 using bus 308. When a load scalar operation is specified, the load operation will load at least the number of bits corresponding to the size of the scalar type (typically, byte, halfword, word, and so forth). Additional bits may be loaded in accordance with implementation choices, or invalid data, or data initialized to a default value (such as, but not limited to, "0") may be provided for those bits outside the range of the requested data type. In one embodiment, the "load scalar" operation includes an alignment step, wherein a requested scalar value is aligned in the preferred slot before being stored to SVRF 310. In another embodiment, alignment is performed programmatically using a sequence of one or more instructions.

In the store mode of operation, the LSU 306 receives data to be stored from the SVRF 310 by means of bus 332, and address information from the preferred slot of the SVRF 310 using bus 331, and stores data to the specified address.

Figure 3B:
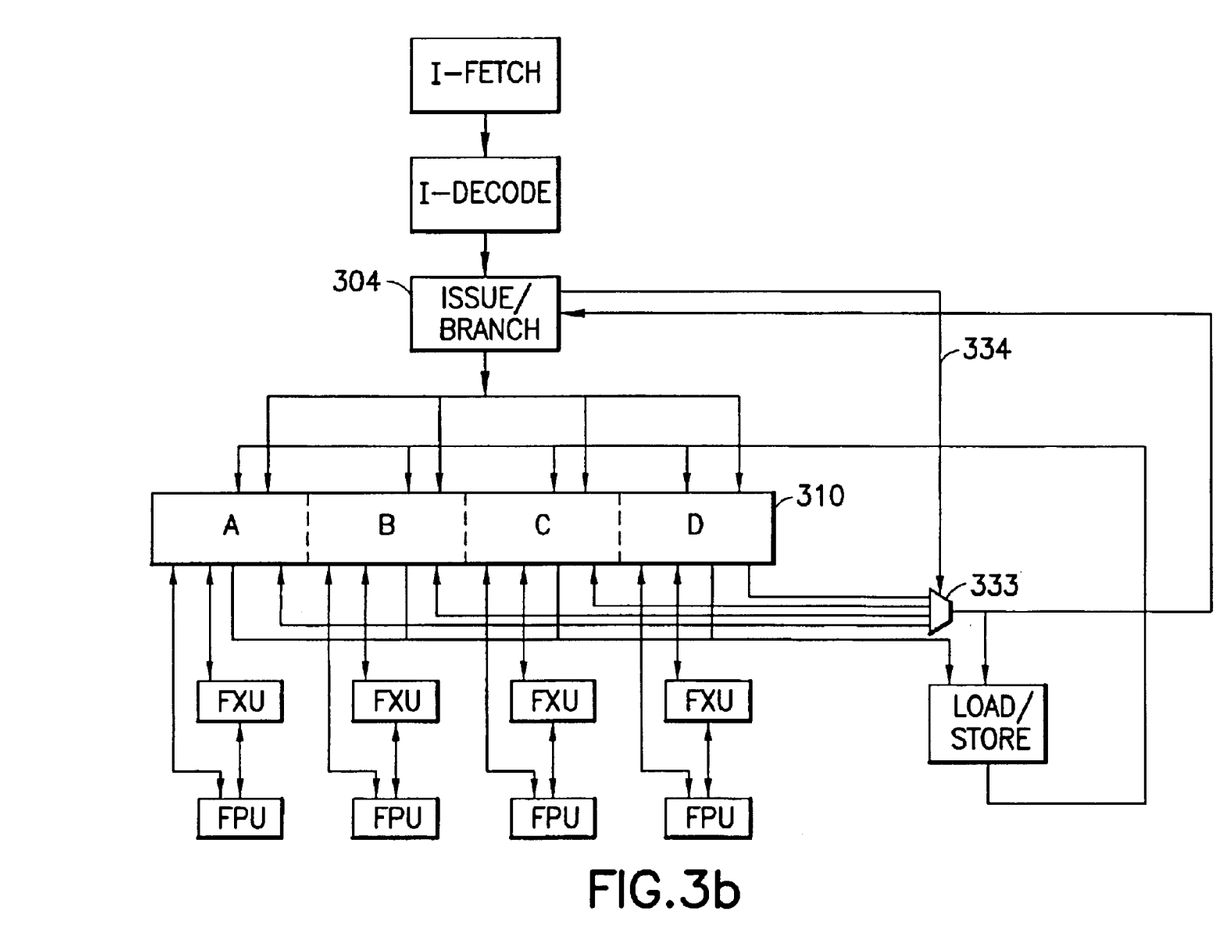
FIG. 3b is a block diagram of an alternative embodiment of the processor implementation of FIG. 3.

FIG. 3b shows a more flexible, although slightly more complex, approach to selecting scalar data for information as may be used by the branch unit and LSU. In accordance with this embodiment of the invention, the various segments of SVRF 310 are selectable by means of a multiplexer 333, which may be controlled with a control input via line 334 from issue/branch unit 304 (which may typically come from a field in the instruction word of the instruction to be executed). Alternate embodiments may include, but are not limited to, a software-controlled special purpose register or a boot-time parameter for supplying the control input of the multiplexer.

The embodiment shown in FIG. 3b operates as follows. When a scalar data value is required by either the load/store unit to supply a memory address for an operation, or by the branch unit to supply, e.g., a branch target address, or a branch condition, or by a shift unit requiring a single shift count to be applied to all elements, or any other unit which may require a scalar data value as its input, the multiplexer 333 is steered by the control input to select one of slots A, B, C, or D as the scalar input for the operation.

Thus, in accordance with this embodiment of the invention, any of the functional unit pairs can be selected as a "preferred slot", allowing processing operations to be balanced, reduce the need for transfer operations between multiple slots and increase the number of slots in which scalar values can be stored.

Two different implementations of a preferred slot for scalar processing have now been described. The first being a hardwired implementation, wherein the preferred slot is selected at the design phase, and a variable approach, where the preferred slot can be selected on the fly, during execution. Designation of a preferred slot at design time can simplify the implementation in that the above-described selection need not be provided. Further, the power-down circuitry to be described below can be eliminated for the functional unit pair that is predesignated as the preferred slot at design time because it will never have to be powered down. Nevertheless, there may be a case for including the power-down logic also in the preferred slot, in order to reduce any design complexity that might be caused by having to include separate functional unit designs, or to achieve further power-savings by entering power-down mode when a functional unit is idle. Use of identical functional unit pairs may be more efficient, even at the slight overhead cost of having useless circuitry which is never exercised for the preferred slot.

Although this embodiment has been described in term of a unified SVRF, with a limited set of functional units, and with no reference to out-of-order execution, it should be apparent to those skilled in the art that the present invention can be practiced by adding additional functional units, or removing several of them, by including out of order issue capability, and to support a variety of instruction set encoding and formats.

Figure 4:
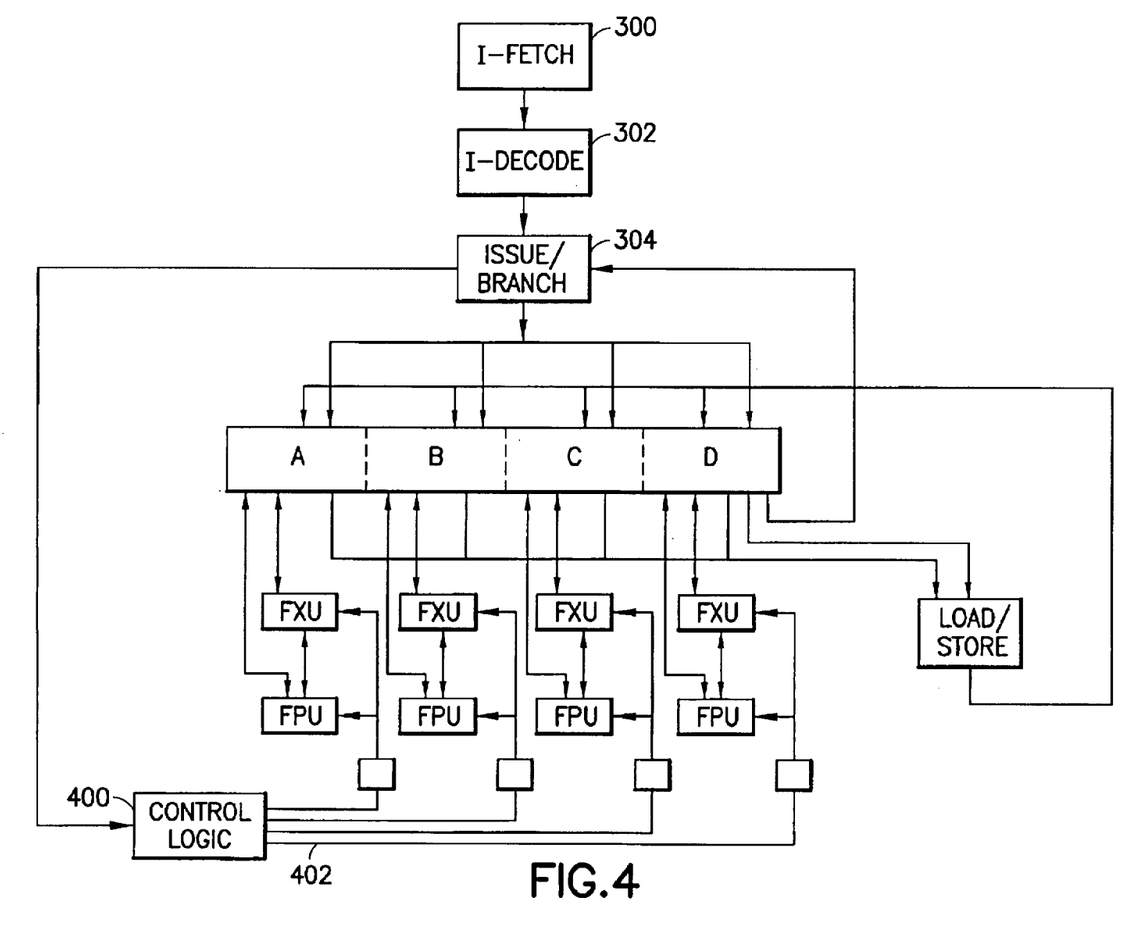
FIG. 4 is a block diagram of a processor implementation with unified scalar and SIMD data processing capability, including power-down capability for selected units to reduce power consumption based on the encoding of instructions, in accordance with the present invention.

Referring now to FIG. 4, there is shown a power-optimized version of the present invention, wherein an instruction is assumed which contains information about whether a specific operation is directed towards scalar or SIMD processing. If scalar processing is selected, then functional units other than the functional units associated with the preferred slot will enter a power-saving operation mode and not produce valid results. The result produced may be implementation defined, or "0", or leaving the previous value unmodified, or any other implementation choice which may be convenient for a particular architecture and/or implementation.

The operation of the embodiment of FIG. 4 is as follows. Instruction fetch 300 fetches an instruction and passes it to instruction decode 302, in the manner described above with respect to FIG. 3. The decoded instruction is passed to issue/branch unit 304 which, in addition to performing the actions described above, after determining whether the instruction to be executed is a scalar or a vector operation, generates a control signal to be passed to control logic 400. The control signal will identify which functional unit pairs (and which functional units within the pairs) will be utilized for the current instruction. Control logic 400 will, in response, generate one or more enable output signals 402, to be applied as enabling inputs to selected functional units. Selected functional units can be enabled or disabled in accordance with the invention by enabling or disabling the clock input for the functional unit, or, in an alternative embodiment, by disabling the power input for the functional unit. The functional unit(s) to be utilized for execution of the instruction will have its clock (or power input) enabled by the output of control logic 400.

For example, if the operation to be performed is a scalar operation, requiring only the use of floating point unit 330, the enabling inputs to the clock (or power input) for all functional units other than FPU 330 will be disabled during the operation. On a subsequent operation, e.g., a vector operation requiring the use of all functional units, the enabling output signals from control logic 400 will enable the clock circuitry (or power input) of each functional unit.

In accordance with this embodiment of the invention, the powering down of idle functional units can result in substantial system power savings.

Figure 5:
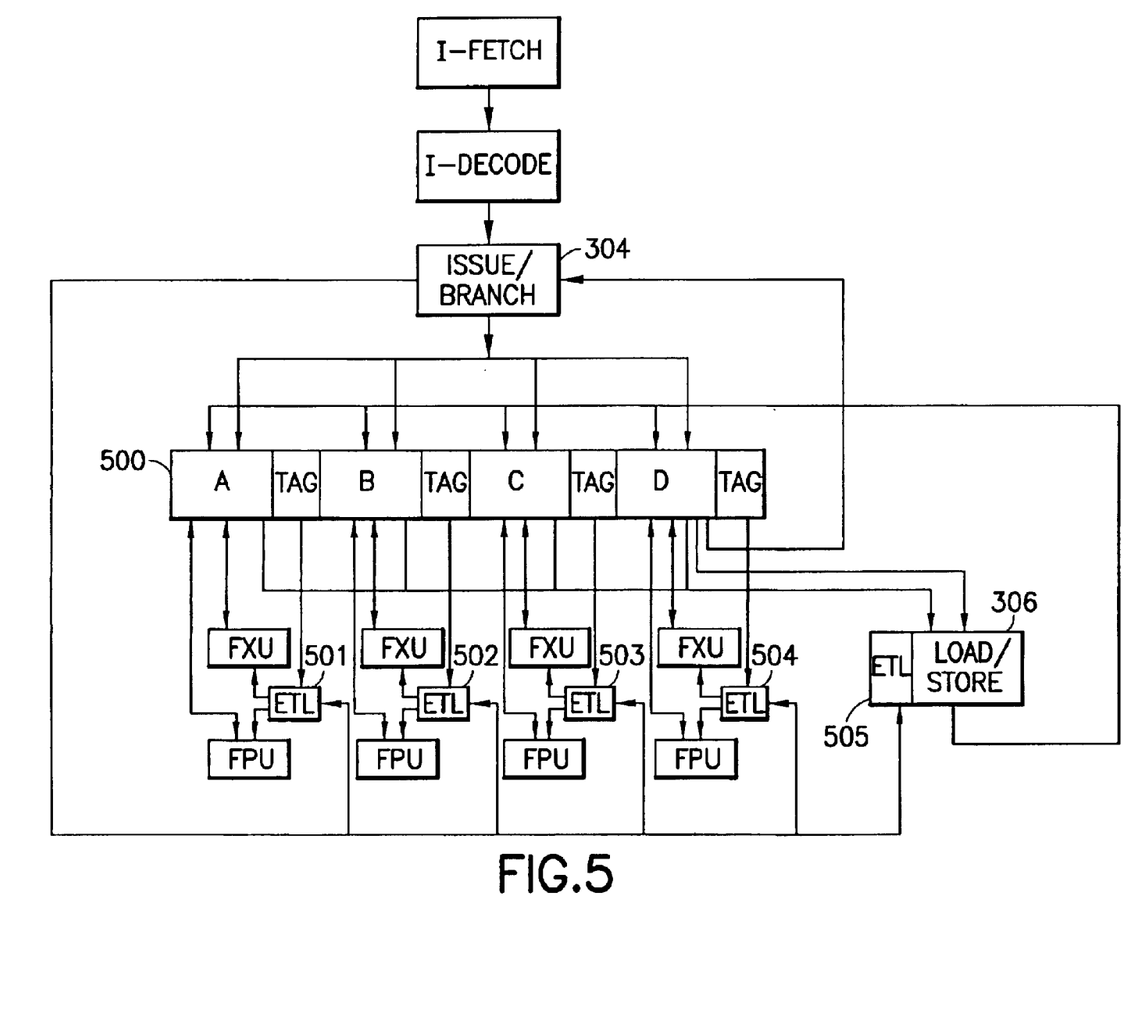
FIG. 5 is a block diagram of a processor implementation with unified scalar and SIMD data processing capability, including power-down capability for selected units to reduce power consumption based on dynamically computed tag bits stored in conjunction with the vector register file in accordance with the present invention.

Referring now to FIG. 5, there is shown another embodiment of the present invention, in which powering down of functional units is controlled by tags associated with the SVRF 310, the tags being updated dynamically in order to determine whether any particular operation is a scalar operation requiring fewer than all functional units, or a vector operation requiring two or more functional unit pairs, or any combination, depending on the embodiment, of 1, 2, 3, or 4 slots.

FIG. 5 shows a segmented SVRF 500, which differs from SVRF 310 in FIG. 3 in that it contains a tag field associated with each register segment. The tag field contains information indicating whether the values in the current slot are valid, and an operation is to be performed on a particular slot, or invalid and the associated functional units should be powered down. The tag associated with the SVRF segment is applied to a special enable tag logic (ETL) unit 501–504 associated with each functional unit pair, the ETL logic also requiring decoded information about the instruction from the instruction decode, e.g., whether it would increase, decrease, change, or maintain the number and location of valid slots, and information to guide power-down, e.g., FXU vs. FPU usage, as described above. The ETL unit generates an enabling output which is used to enable or disable the clock (or power input) signal for the associated functional units, depending on whether they will be utilized to process the current instruction. Furthermore, FIG. 5 shows a special enable tag logic unit 505 for the load/store unit, responsible for guiding the operation and setting of tags during load and store operations. The operation of the load/store unit ETL logic unit 505 and the setting of tags in the SVRF is discussed below with respect to FIG. 7.

Figure 6:
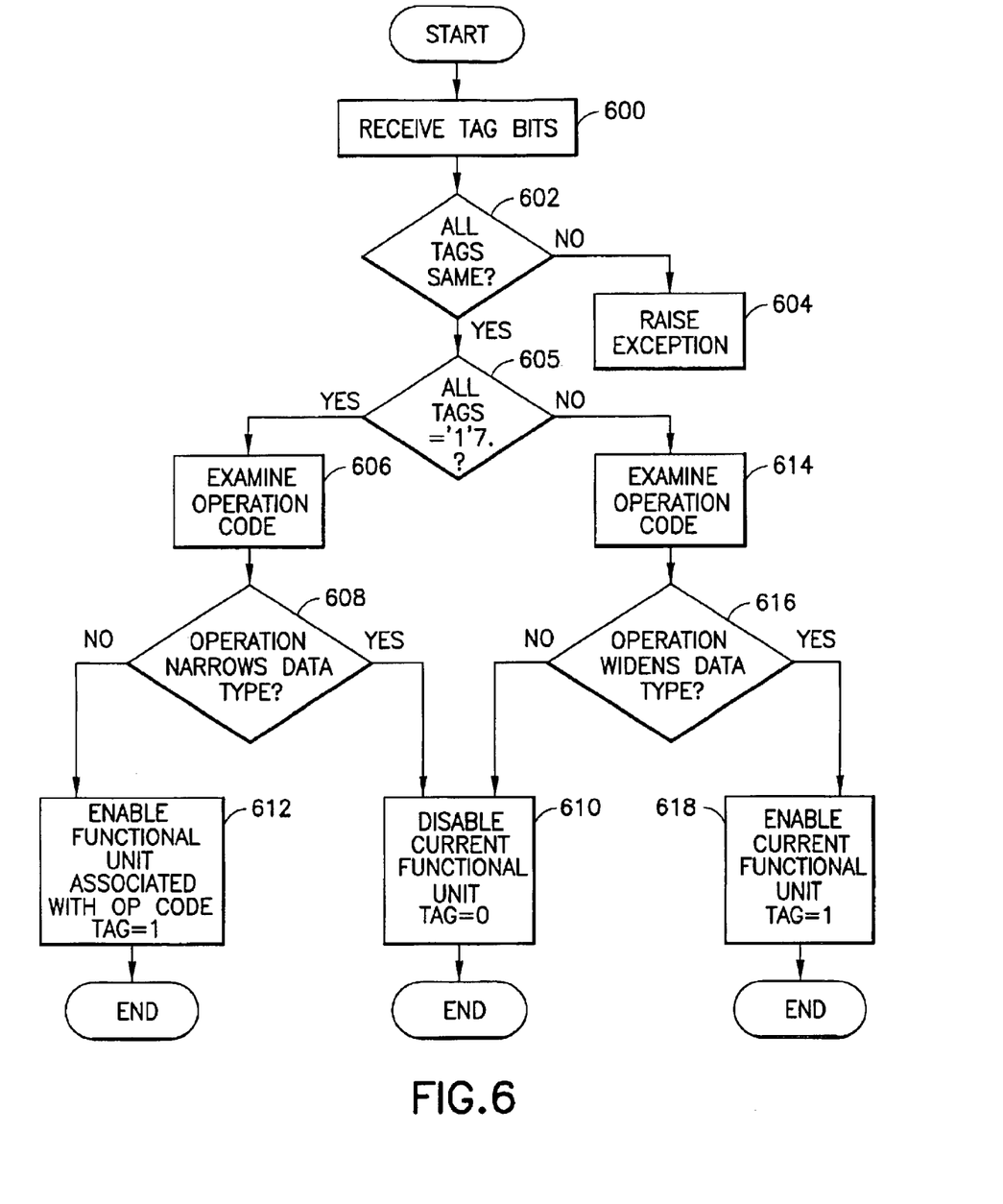
FIG. 6 is a flow diagram describing the operation of the enable tag logic units 501–504 associated with each slot of FIG. 5 in accordance with the present invention.

The operation of ETL units 501–504 is now described with reference to the flow diagram in FIG. 6. In step 600, each ETL unit receives a tag bit from SVRF 500 for each datum to be processed by a functional unit. That is, there will be a single tag bit for operations with one register operand, or multiple tag bits (one associated with each datum) if multiple register data are the operands of an operation. This embodiment is exemplary; the tag field for a given datum may occupy more than one bit if desired. At step 602, the ETL units 501–504 examine the tag bit for all data provided to their associated functional unit pair to determine whether all tag bits are the same. If all tag bits examined by a given ETL unit are not the same, then special processing is performed, e.g., a processor exception may be raised at step 604. Alternative implementations may proceed with processing and ignoring such a condition, or substitute a defined value (e.g., "0") for invalid inputs, or take any other special processing step. In particular, instructions which take some scalar and some vector inputs (e.g., some shift instructions may be implemented like this) may allow some tags (corresponding to scalar input data, e.g., shift counts) to differ from inputs which may supply either vector or scalar data (e.g., the shift count could be either a vector or a single scalar value) without performing any special processing. Alternatively, one could design the system to set the undefined operand to zero, or disable the output tag by generating an invalid output which is identified as such by not setting the tag bit, if the tag bits are not the same. If all tag bits are the same, the process proceeds to step 605. If, at step 605, all tags are determined to be set, then the current slot (functional unit pair) received valid input data. This would typically be the case if the method operates in the preferred slot, or SIMD data is being processed. If, on the other hand, both tag bits are reset, then the current slot has not received valid input data from the SVRF 500. This would typically occur when scalar data is being processed by an instruction and the method operates in other than the preferred slot.

If, at step 605, the tag bits are determined to be set, the process proceeds to step 606, where ETL 500 examines the operation code provided to the functional unit by the issue/branch unit 304 to determine whether to change the current data to scalar prior to output. At step 608, if the data type in the current operation is to be changed to scalar prior to output (whereby the data in the current slot will no longer be valid, hence "narrowing" the data line provided by SVRF 500 to include only a single valid data word) the process proceeds to 610, where the current functional unit's output will be tagged with a '0', indicating invalid data. If the current slot is not to be invalidated upon output at step 612, the tag for the output of the functional unit is set to '1'.

If, at step 605, it is determined that all tag bits for data words (operands) provided to the given ETL are reset, i.e., '0', the data that has been provided to the functional unit is not valid data. At step 614, operation code provided to the associated functional unit pair is examined to determine whether the operation being performed by the parallel vector unit will result in an expanded output requiring storage of data in the current shot. If, at step 616, it is determined that the result will be expanded to occupy the current slot, then the functional unit output will receive a tag of '1' at step 618. If no such expansion is to occur, then the output receives a tag of '0'.

The tag computed by this method is stored as the tag of the output result of the current operation with the current operation's result. It is furthermore used to guide the power-down logic of the functional units attached to the current slot.

Figure 7:
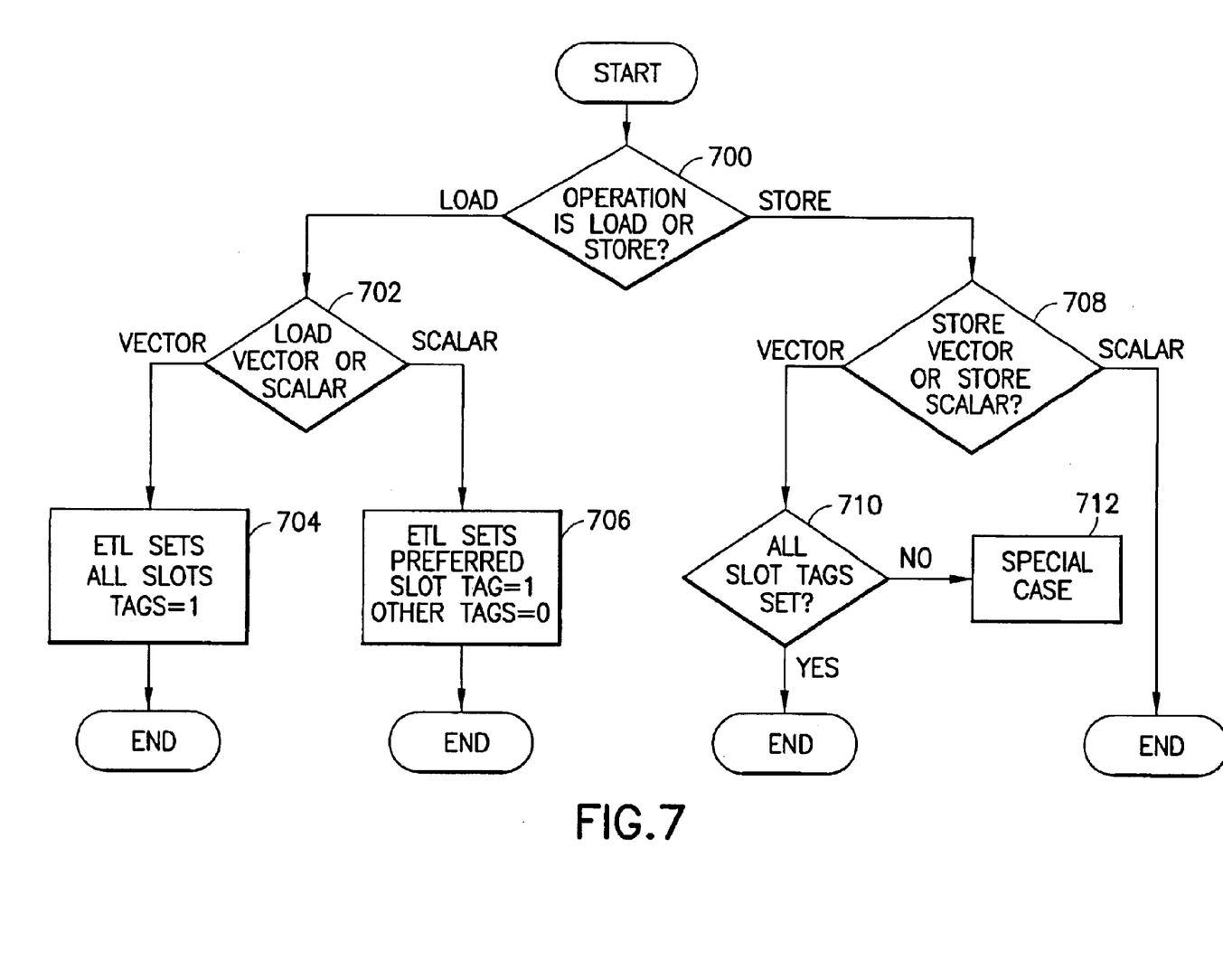
FIG. 7 is a flow diagram describing the operation of enable tag logic unit 505 of FIG. 5, in accordance with the present invention.

The operation of the ETL unit 505 associated with the load/store unit is now described with reference to the flow diagram shown in FIG. 7. At step 700, it is determined whether the load/store unit 306 is loading data to SVRF 500 from memory. If a load operation is processed, the tag for each data word is set according to whether a vector or scalar load is performed as determined at step 702. For vector loads, the tags of all slots are set at step 704. For scalar loads, the enable tag of the preferred slot is set, and all other tags are reset at step 706. Alternative embodiments may include partial vector load instructions whereby more than one slot, but fewer than all slots are loaded and enabled by setting the tag bit.

If it is determined at step 700 that a store operation is to be performed, then at step 708 it is determined whether the data to be stored is vector or scalar. If a store scalar operation is performed, the method terminates. If a store vector operation is performed, then at step 710 the slot tags are tested, to ensure all slots which are to be saved are valid. That is, if a store vector operation is performed, the test of step 710 ensures that the tag bit settings are consistent with this operation. The settings would be inconsistent, for example, if the tag bits indicated that the data is scalar, not vector. If they are consistent, the method terminates.

If invalid slots are to be stored, i.e., the tag bits indicate scalar data, a special case is processed at step 712. This special case can for example involve the storing of 0 for undefined slots, producing undefined results, or raising a processor exception.

It should be apparent to those skilled in the art that the foregoing systems and methods are not limited to selecting either a single slot for scalar processing or all slots for scalar processing. Some implementations may support modes wherein a limited number of slots (greater than one) are enabled to process most vector data types.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A processor designed to operate in a plurality of modes for processing vector and scalar instructions, where a vector instruction identifies a single operation to be performed on a plurality of data elements, and a scalar instruction identifies a single operation to be performed on a single data element, comprising:

one or more register, files, each for storing data directly usable as scalar data vector data and address information;

a parallel vector unit coupled to receive data from the one or more register files and comprising a plurality of functional units configurable to operate in a vector operation mode and a scalar operation mode, the parallel vector unit includes means for tightly coupling a plurality of the functional units to perform an operation specified by a current instruction;

wherein under a vector operation mode the parallel vector unit performs, in parallel, a single vector operation on a plurality of data elements, the operations performed on the plurality of data elements each being performed by a different functional unit of the parallel vector unit; and wherein under a scalar operation mode the parallel vector unit performs a scalar operation on a data element received from the one or more register files in a functional unit within the parallel vector unit.

2. The processor of claim 1, wherein the parallel vector unit includes a mode selector which reads a mode identifier associated with each instruction and causes the parallel vector unit to enter vector operation mode or scalar operation mode depending on the value of the mode identifier.

3. The processor of claim 1, further including a power savings unit which disables functional units not used for processing a given instruction.

4. The processor of claim 3, wherein the functional units are disabled by disabling their clock input signals.

5. The processor of claim 3, wherein the functional units are disabled by disabling their supply voltage.

6. The processor of claim 3, wherein the power savings unit disables unused functional units during scalar operations.

7. The processor of claim 1, further comprising means for designating one or more functional units necessary for execution of an instruction as preferred slots.

8. The processor of claim 7, wherein the means for designating includes an issue/branch unit coupled to the parallel vector unit, including means for reading an instruction and determining what functional units are necessary for performing the instruction, and designating such units as preferred slots.

9. The processor of claim 7, wherein the means for designating includes a tag associated with each datum stored in the one or more register filed indicating whether the datum is valid or invalid data, and enable tag logic coupled to the one or more register files, wherein each tag, if set, causes the enable tag logic to cause one or more functional units to be active for processing an instruction.

10. The processor of claim 7, wherein the preferred slots are designated at system design.

11. The processor of claim 1, wherein the one or more registers each further store conditional information.

12. The processor of claim 2, wherein each of the one or more registers comprises at least one mode identifier field for storing at least one mode identifier therein.

13. The processor of claim 12, further comprising means for designating one or more functional units necessary for execution of an instruction as preferred slots, and wherein the at least one mode identifier field comprises information indicating whether values in a current slot are valid and an operation is to be performed on a particular slot, or whether the values in the current slot are invalid and associated ones of the plurality of functional units are to be powered down.

14. The processor of claim 12, wherein the at least one mode identifier field comprises a plurality of mode identifier fields, each of the one or more registers comprises a plurality of register segments, and each of the plurality of register segments is associated with a different one of the plurality of mode identifier fields.

15. The processor of claim 14, wherein the at least one mode identifier is dynamically determined based on pre-identified criteria.

16. The processor of claim 15, wherein the pre-identified criteria comprises whether a current operation is widening or narrowing.

17. The processor of claim 15, further comprising means for designating one or more functional units necessary for execution of an instruction as preferred slots, and wherein the mode identifier includes decoding information for a given operation, the decoding information comprising whether the given operation increases, decreases, changes or maintains a number and location of valid slots.

18. The processor of claim 17, wherein the decoding information further comprises information relating to powering down of corresponding ones of the plurality of functional units.

19. The processor of claim 2, wherein, for a given instruction, a corresponding mode identifier is evaluated to determined if computational consistency has been maintained or if an exceptional situation has occurred with respect to the given instruction.

20. The processor of claim 1, wherein each of the one or more registers comprises a plurality of register segments, each of the plurality of register segments being responsive to a selection thereof by a multiplexer.

21. A processor designed to operate in a plurality of modes for processing vector and scalar instructions, where a vector instruction identifies a single operation to be performed on a plurality of data elements, and a scalar instruction identifies a single operation to be performed on a single data element, comprising:

one or more merged Single Instruction Stream, Multiple Data Stream (SIMD)/scalar register files, each for storing data directly usable as scalar data, vactor data, and conditional data one or more address register files, each for storing address information;

a parallel vector unit coupled to receive data from the one or more merged SLMD/scalar register files and comprising a plurality of functional units configurable to operate in a vector operation mode and a scalar operation mode, the parallel vector unit includes means for tightly coupling a plurality of the functional units to perform an operation specified by a current instruction;

wherein under a vector operation mode the parallel vector unit performs, in parallel, a single vector operation on a plurality of data elements, the operations performed on the plurality of data elements each being performed by a different functional unit of the parallel vector unit; and wherein under a scalar operation mode the parallel vector unit performs a scalar operation on a data element received from the one or more merged SIMD/scalar register files in a functional unit within the parallel vector unit.

* * * * *